United States Patent
Ha et al.

(10) Patent No.: US 12,142,760 B2
(45) Date of Patent: Nov. 12, 2024

(54) CATHODE ACTIVE MATERIAL FOR ALL-SOLID-STATE BATTERY COMPRISING COATING LAYER INCLUDING TERNARY OXIDE AND METHOD OF MANUFACTURING SAME

(71) Applicants: HYUNDAI MOTOR COMPANY, Seoul (KR); KIA CORPORATION, Seoul (KR); Ulsan National Institute of Science and Technology, Ulsan (KR)

(72) Inventors: A Reum Ha, Ulsan (KR); Ju Yeong Seong, Suwon-si (KR); Yong Gu Kim, Suwon-si (KR); In Woo Song, Gwacheon-si (KR); Hong Seok Min, Yongin-si (KR); Yong Sub Yoon, Seoul (KR); Yun Sung Kim, Seoul (KR); Sung Woo Noh, Seoul (KR); Yong Jun Jang, Seoul (KR); Sang Heon Lee, Seongnam-si (KR); Jae Phil Cho, Yongin-si (KR); Hyo Myoung Lee, Ulsan (KR)

(73) Assignees: HYUNDAI MOTOR COMPANY, Seoul (KR); KIA CORPORATION, Seoul (KR); ULSAN National Institute of Science and Technology, Ulsan (KR)

( * ) Notice: Subject to any disclaimer, the term of this patent is extended or adjusted under 35 U.S.C. 154(b) by 111 days.

(21) Appl. No.: 17/331,269

(22) Filed: May 26, 2021

(65) Prior Publication Data
US 2022/0069298 A1   Mar. 3, 2022

(30) Foreign Application Priority Data
Sep. 1, 2020   (KR) .................. 10-2020-0110731

(51) Int. Cl.
  *H01M 4/525*    (2010.01)
  *H01M 4/04*     (2006.01)
  (Continued)

(52) U.S. Cl.
  CPC .......... *H01M 4/525* (2013.01); *H01M 4/0416* (2013.01); *H01M 4/131* (2013.01);
  (Continued)

(58) Field of Classification Search
  CPC .... H01M 4/525; H01M 4/0416; H01M 4/366; H01M 4/382; H01M 4/505;
  (Continued)

(56) References Cited

U.S. PATENT DOCUMENTS

2011/0076556 A1*  3/2011  Karthikeyan ......... H01M 4/485
                                                     429/188
2014/0072874 A1*  3/2014  Kim .................... H01M 10/052
                                                     427/126.3
(Continued)

FOREIGN PATENT DOCUMENTS

EP       3522268 A1 *  8/2019  ........ H01M 10/0525
JP       2009-266728 A   11/2009
(Continued)

OTHER PUBLICATIONS

English Translation of WO 2014032405 A1; Composite Positive Electrode Material for Full Solid State Lithium Ion Battery, Preparation Process Therefor and Full Solid State Lithium Ion Battery; Pei Jianing; Huawei Tech Co Ltd; Mar. 6, 2014 (Year: 2014).*
(Continued)

*Primary Examiner* — Matthew T Martin
*Assistant Examiner* — Adam J Francis
(74) *Attorney, Agent, or Firm* — Morgan, Lewis & Bockius LLP

(57) ABSTRACT

A cathode active material for an all-solid-state battery includes: active material particles; and a coating layer cov-
(Continued)

ering at least a portion of the surface of the active material particles, wherein the coating layer includes lithium (Li), niobium (Nb), and at least one element selected from the group consisting of vanadium (V), zirconium (Zr) and combinations thereof.

1 Claim, 13 Drawing Sheets

(51) Int. Cl.
H01M 4/131 (2010.01)
H01M 4/1391 (2010.01)
H01M 4/36 (2006.01)
H01M 4/38 (2006.01)
H01M 4/505 (2010.01)

(52) U.S. Cl.
CPC ......... *H01M 4/1391* (2013.01); *H01M 4/366* (2013.01); *H01M 4/382* (2013.01); *H01M 4/505* (2013.01)

(58) Field of Classification Search
CPC .. H01M 4/0471; H01M 4/131; H01M 4/1391; H01M 4/364; H01M 4/62; H01M 4/485; C01P 2002/85; C01P 2002/52; C01P 2004/03; C01P 2004/04; C01P 2004/51; C01P 2004/61; C01P 2004/80; C01P 2006/40; C01G 53/50; C01G 33/00; C01G 33/006
See application file for complete search history.

(56) References Cited

U.S. PATENT DOCUMENTS

| 2015/0214550 | A1* | 7/2015 | Song | H01M 4/505 |
| | | | | 429/231.1 |
| 2015/0340689 | A1* | 11/2015 | Song | H01M 4/5825 |
| | | | | 427/126.3 |
| 2015/0357638 | A1* | 12/2015 | Sun | H01M 4/366 |
| | | | | 429/231.95 |
| 2016/0049645 | A1* | 2/2016 | Zheng | H01M 4/505 |
| | | | | 429/223 |
| 2017/0077504 | A1* | 3/2017 | Ise | H01M 4/485 |
| 2018/0323435 | A1* | 11/2018 | Lim | C01G 35/006 |
| 2020/0328414 | A1* | 10/2020 | Yoo | H01M 4/1391 |

FOREIGN PATENT DOCUMENTS

| JP | 2011-187370 A | 9/2011 | |
| JP | 5979138 B | 8/2016 | |
| KR | 10-0277796 B | 2/2001 | |
| KR | 20160023147 A * | 3/2016 | |
| WO | WO-2014032405 A1 * | 3/2014 | ........ H01M 10/0525 |
| WO | WO 2012/157046 A | 7/2014 | |

OTHER PUBLICATIONS

English Translation of KR20160023147A—Positive electrode active material for lithium secondary battery and lithium secondary battery comprising same; LG Chemical; Mar. 3, 2016 (Year: 2016).*

* cited by examiner

CATHODE ACTIVE MATERIAL FOR ALL-SOLID-STATE BATTERY COMPRISING COATING LAYER INCLUDING TERNARY OXIDE AND METHOD OF MANUFACTURING SAME

CROSS REFERENCE TO RELATED APPLICATION

The present application claims priority to and the benefit of Korean Patent Application No. 10-2020-0110731, filed on Sep. 1, 2020, the entire content of which are incorporated herein by reference.

FIELD

The present disclosure relates to a cathode active material for an all-solid-state battery and a method of manufacturing the same.

BACKGROUND

The statements in this section merely provide background information related to the present disclosure and may not constitute prior art.

Since the commercialization of lithium secondary batteries in the early 1990s, many advances have been made in materials for cathodes and anodes or in the design of cells in order to increase energy density. Moreover, these batteries are applied in a variety of fields, from small-sized products such as mobile phones, laptops and the like to mid- to large-sized products such as electric vehicles and energy storage systems.

Lithium secondary batteries that are currently widely used mainly use a liquid electrolyte composed of an organic solvent, but the liquid electrolyte entails the risk of explosion in the event of an internal short-circuit or an increase in temperature. In response to this risk, all-solid-state batteries using a solid electrolyte have been developed. All-solid-state batteries are very safe and are thus regarded as having an advantage over other types of batteries in view of simplification of safety devices and productivity. Accordingly, the development of a solid electrolyte having high ionic conductivity is being actively carried out, and attempts have been made to improve the performance of all-solid-state batteries by focusing on the interfacial reaction between the solid electrolyte and the cathode active material.

Meanwhile, examples of cathode active materials that are currently actively researched and developed may include $LiNiO_2$, $LiMn_2O_4$, $LifePO_4$, $Li(Ni_xCo_yMn_z)O_2$, and the like.

However, $LiNiO_2$ is difficult to synthesize, and also has poor thermal stability, making it difficult to commercialize the same. $LiMn_2O_4$ is a low-priced product and has been commercialized in some cases, but the lifetime thereof is not good due to Jahn-Teller distortion caused by $Mn^{3+}$. $LifePO_4$ is inexpensive and has superior safety, so many studies are currently conducted with the goal of use thereof in hybrid electric vehicles (HEVs), but practical application thereof has been difficult due to the low conductivity thereof.

The most popular material in recent years is $Li(Ni_xCo_yMn_z)O_2$. This material is inexpensive and has high capacity compared to $LicoO_2$, and may also be used under high-voltage conditions. However, the rate capability and lifetime characteristics at high temperatures are not good. Thorough research is ongoing into methods of coating the surface of a cathode active material with a metal having high conductivity, or of doping the interior thereof with a material such as Al, Mg, Ti, Zr, Sn, Ca, Ag and Zn.

For example, Korean Patent No. 10-277796 discloses a technique of forming a metal oxide coating by coating the surface of a cathode active material with a metal such as Mg, Al, Co, K, Na or Ca and performing heat treatment in an oxidizing atmosphere.

However, additional study to improve the performance of the battery by reducing the resistance between the cathode active material and the solid electrolyte and increasing the conductivity is still desired.

SUMMARY

The present disclosure provides a cathode active material for an all-solid-state battery including a coating layer containing ternary oxide capable of reducing battery resistance and improving battery performance due thereto and a method of manufacturing the same.

The present disclosure are not limited to the foregoing, and will be able to be clearly understood through the following description and to be realized by the means described in the claims and combinations thereof.

One form of the present disclosure provides a cathode active material for an all-solid-state battery, including: active material particles; and a coating layer covering at least a portion of a surface of the active material particles, wherein the coating layer includes lithium (Li), niobium (Nb), and at least one element selected from the group consisting of vanadium (V), zirconium (Zr) and combinations thereof.

The active material particles may include a compound represented by Chemical Formula 1 below:

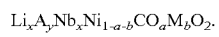  [Chemical Formula 1]

In Chemical Formula 1, A is at least one element selected from the group consisting of vanadium (V), zirconium (Zr) and combinations thereof, M is at least one element selected from the group consisting of manganese (Mn), aluminum (Al), magnesium (Mg) and combinations thereof, and x, y, w, a and b are $0.98 \le x \le 1.02$, $0 \le y \le 0.01$, $0 \le w \le 0.8$, $0 < a \le 0.1$ and $0 \le b \le 0.1$, respectively.

The coating layer may include lithium oxide represented by Chemical Formula 2 below:

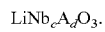  [Chemical Formula 2]

In Chemical Formula 2, A is at least one element selected from the group consisting of vanadium (V), zirconium (Zr) and combinations thereof, and c and d are $0 < c \le 0.8$ and $0 < d \le 0.01$, respectively.

The cathode active material may include niobium (Nb) in a concentration of 11,000 ppm to 12,000 ppm.

The cathode active material may include vanadium (V) in a concentration of 5,400 ppm to 8,600 ppm.

The cathode active material may include zirconium (Zr) in a concentration of 5,400 ppm to 8,600 ppm.

Another form of the present disclosure provides a method of manufacturing a cathode active material for an all-solid-state battery, including: preparing a mixture including an active-material particle precursor, a lithium (Li) precursor, a niobium (Nb) precursor, and at least one material selected from the group consisting of a vanadium (V) precursor, a zirconium (Zr) precursor and combinations thereof; stirring the mixture; and calcining a result of the stirring.

The mixture may be prepared by adding a solvent with a lithium (Li) precursor and at least one substance selected from the group consisting of a vanadium (V) precursor, a zirconium (Zr) precursor and combinations thereof and performing mixing, adding the resulting mixture with a niobium (Nb) precursor and performing mixing, and adding the resulting mixture with an active-material particle precursor.

The active-material particle precursor, the lithium (Li) precursor and the zirconium (Zr) precursor may be in a powder phase, and the niobium (Nb) precursor and the vanadium (V) precursor may be in a liquid phase.

The method may further include performing drying after stirring the mixture.

In the method, the result of the stirring may be calcined at 300° C. to 800° C. for 1 hr to 5 hr in an oxygen atmosphere.

According to the present disclosure, battery resistance can be reduced, and thus an all-solid-state battery having improved battery performance, such as battery capacity, coulomb efficiency and the like, can be obtained.

The effects of the present disclosure are not limited to the foregoing, and should be understood to include all effects that can be reasonably anticipated from the following description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
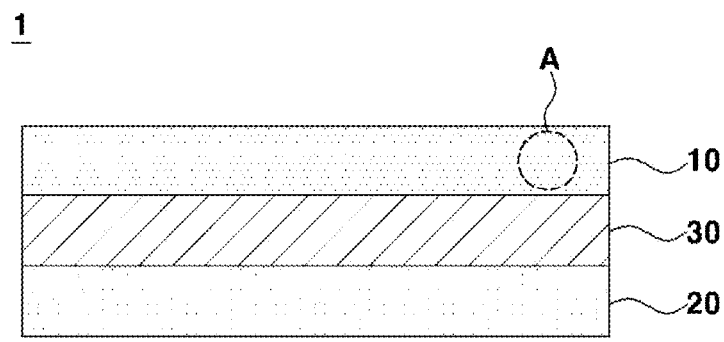
FIG. 1 shows an all-solid-state battery according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The above and other objectives, features and advantages of the present disclosure will be more clearly understood from the following preferred forms taken in conjunction with the accompanying drawings. However, the present disclosure is not limited to various forms disclosed herein, and may be modified into different forms. These forms are provided to thoroughly explain the disclosure and to sufficiently transfer the spirit of the present disclosure to those skilled in the art.

Throughout the drawings, the same reference numerals will refer to the same or like elements. For the sake of clarity of the present disclosure, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present disclosure. Similarly, the "second" element could also be termed a "first" element. As used herein, the singular forms are intended to include the plural forms as well, unless the context clearly indicates otherwise.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

FIG. 1 shows the all-solid-state battery according to the present disclosure. With reference thereto, the all-solid-state battery 1 includes a cathode 10, an anode 20, and a solid electrolyte layer 30 interposed between the cathode 10 and the anode 20.

Figure 2:
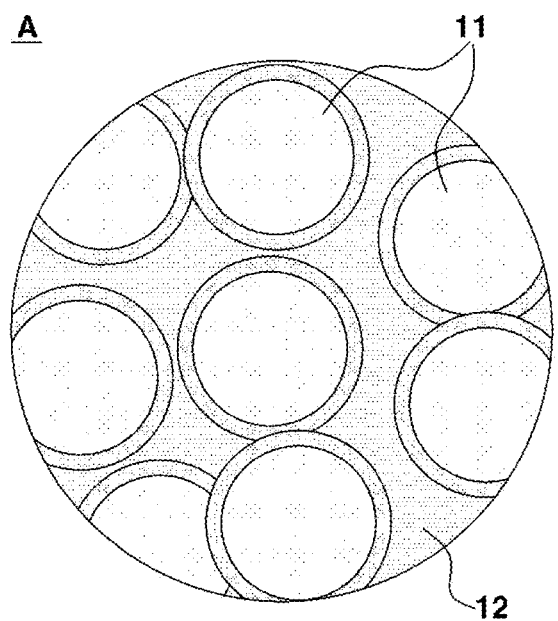
FIG. 2 is an enlarged view of a portion A of the cathode shown in FIG. 1.

FIG. 2 is an enlarged view of a portion A of the cathode 10 shown in FIG. 1. With reference thereto, the cathode 10 may include a cathode active material 11 and a solid electrolyte 12 provided around the cathode active material 11.

The present disclosure aims to increase the stability of the interface formed by the cathode active material 11 and the solid electrolyte 12 inside the cathode 10 to thus reduce the internal resistance of the battery.

The solid electrolyte 12 is not particularly limited, and may be, for example, an oxide-based solid electrolyte or a sulfide-based solid electrolyte. However, it may be desirable to use a sulfide-based solid electrolyte having high lithium-ion conductivity.

Examples of the sulfide-based solid electrolyte may include $Li_2S$—$P_2S_5$, $Li_2S$—$P_2S_5$—$LiI$, $Li_2S$—$P_2S_5$—$LiCl$, $Li_2S$—$P_2S_5$—$LiBr$, $Li_2S$—$P_2S_5$—$Li_2O$, $Li_2S$—$P_2S_5$—$Li_2O$—$LiI$, $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_mS_n$ (in which m and n are positive numbers and Z is any one of Ge, Zn, and Ga), $Li_2S$—$GeS_2$, $Li_2S$—$SiS_2$—$Li_3PO_4$, $Li_2S$—$SiS_2$-$Li_xMO_y$, (in which x and y are positive numbers and M is any one of P, Si, Ge, B, Al, Ga, and In), $Li_{10}GeP_2S_{12}$, and the like.

Figure 3:
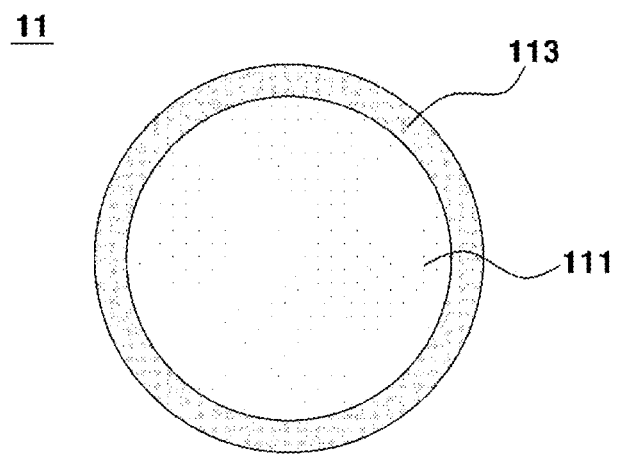
FIG. 3 shows a cathode active material according to the present disclosure.

FIG. 3 shows the cathode active material 11 according to the present disclosure. With reference thereto, the cathode active material 11 may include active material particles 111 and a coating layer 113 covering at least a portion of the surface of the active material particles 111.

In the present disclosure, in order to increase the stability of the interface between the cathode active material 11 and the solid electrolyte 12 and to increase the conductivity of lithium ions, the active material particles 111 and/or the coating layer 113 may be added with or doped with niobium (Nb) and at least one element selected from the group consisting of vanadium (V), zirconium (Zr) and combinations thereof.

Specifically, the active material particles 111 may include a compound represented by Chemical Formula 1 below:

$Li_xA_yNb_xNi_{1-a-b}Co_aM_bO_2$. [Chemical Formula 1]

In Chemical Formula 1, A is at least one element selected from the group consisting of vanadium (V), zirconium (Zr) and combinations thereof, M is at least one element selected from the group consisting of manganese (Mn), aluminum (Al), magnesium (Mg) and combinations thereof, and x, y, w, a and b are 0.98≤x≤1.02, 0≤y≤0.01, 0≤w≤0.8, 0<a≤0.1 and 0≤b≤0.1, respectively.

Here, when A includes both vanadium (V) and zirconium (Zr), the compound of Chemical Formula 1 may be represented as shown below.

$Li_x(V_{1-z}Zr_z)_yNb_wNi_{1-a-b}Co_bMO_2$ (in which z is a number less than 1 but exceeding 0)

Also, the coating layer 113 may include lithium oxide, represented by Chemical Formula 2 below:

$LiNb_cA_dO_3$. [Chemical Formula 2]

In Chemical Formula 2, A is at least one element selected from the group consisting of vanadium (V), zirconium (Zr) and combinations thereof, and c and d are 0<c≤0.8 and 0<d≤0.01, respectively.

When A includes both vanadium (V) and zirconium (Zr), the compound of Chemical Formula 2 may be represented as shown below.

$LiNb_c(V_{1-z}Zr_z)_dO_3$ (in which z is a number less than 1 but exceeding 0)

In the present disclosure, in order to add or dope the active material particles 111 and/or the coating layer 113 with niobium (Nb) and at least one element selected from the group consisting of vanadium (V), zirconium (Zr) and combinations thereof, the cathode active material 11 is manufactured through a sol-gel method.

Figure 4:
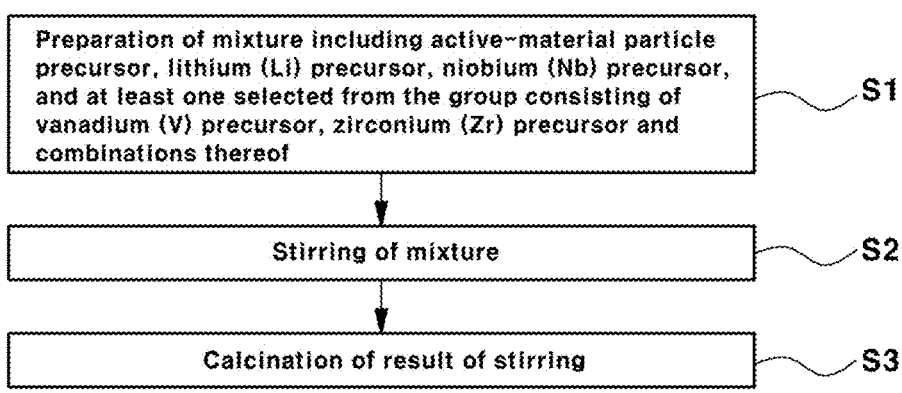
FIG. 4 is a flowchart showing a process of manufacturing a cathode active material according to the present disclosure.

FIG. 4 is a flowchart showing the process of manufacturing the cathode active material according to the present disclosure. With reference thereto, the method includes preparing a mixture including an active-material particle precursor, a lithium (Li) precursor, a niobium (Nb) precursor, and at least one substance selected from the group consisting of a vanadium (V) precursor, a zirconium (Zr) precursor and combinations thereof (S1), stirring the mixture (S2), and calcining a result of the stirring (S3).

The mixture may be prepared by adding a solvent with a lithium (Li) precursor and at least one substance selected from the group consisting of a vanadium (V) precursor, a zirconium (Zr) precursor and combinations thereof and performing mixing, adding a result of the mixing with a niobium (Nb) precursor and performing mixing, and adding a result of the mixing with an active-material particle precursor.

The lithium (Li) precursor is not particularly limited, but may be, for example, lithium ethoxide, and may be used in a powder phase.

The vanadium (V) precursor is not particularly limited, but may be, for example, vanadium ethoxide, and may be used in a liquid phase.

The zirconium (Zr) precursor is not particularly limited, but may be, for example, zirconium ethoxide, and may be used in a powder phase.

The niobium (Nb) precursor is not particularly limited, but may be, for example, niobium ethoxide, and may be used in a liquid phase.

As used herein, the "active-material particle precursor" does not mean a raw material for adding or doping a specific element such as the lithium (Li) precursor, etc., but refers to the pristine state of the above-described active material particles before being doped with niobium (Nb), vanadium (V), zirconium (Zr), etc. Specifically, the active-material particle precursor may be a compound represented by Li(Ni$_x$Co$_y$Mn$_z$)O$_z$.

The active-material particle precursor that is used may be in a powder phase.

The solvent may be used without limitation, so long as it is capable of dispersing and/or dissolving the precursors, and may include, for example, anhydrous ethanol.

Individual mixing conditions for preparing the mixture are not particularly limited, and, for example, mixing may be performed at a temperature of 25° C. to 50° C. for 1 min to 3 hr at a rate of 300 rpm to 500 rpm.

Thereafter, the mixture is stirred to afford a result of the stirring in which lithium (Li), vanadium (V), zirconium (Zr), etc. are attached in the form of an element, compound, or oxide to the surface of the active-material particle precursor (S2). Then, the result thus obtained may be dried to afford a powder.

Finally, the result of the stirring is calcined in an oxygen atmosphere, thus obtaining the aforementioned cathode active material (S3). The calcination conditions are not particularly limited, and, for example, calcination may be performed at a temperature of 300° C. to 800° C. for 1 hr to 5 hr in an oxygen atmosphere.

A better understanding of the present disclosure may be obtained through the following examples. These examples are merely set forth to illustrate the present disclosure, and are not to be construed as limiting the scope of the present disclosure.

Examples 1 to 3 and Comparative Examples 1 and 2

Respective mixtures were prepared using the components in the amounts shown in Table 1 below.

TABLE 1

| Classification | Comparative Example 1 | Example 1 | Example 2 | Comparative Example 2 | Example 3 |
|---|---|---|---|---|---|
| Active-material particle precursor [parts by weight] | 100 | 100 | 100 | 100 | 100 |
| Lithium ethoxide [parts by weight] | — | 0.3 | 0.3 | 0.3 | 0.3 |
| Niobium ethoxide [parts by weight] | — | 1.8 | 1.8 | 1.8 | 1.3 |
| Vanadium ethoxide [parts by weight] | — | 0.2 | 0.5 | 1 | — |
| Zirconium ethoxide [parts by weight] | — | — | — | — | 0.3 |

Example 1

In the composition according to Example 1 of Table 1, lithium ethoxide (powder) and vanadium ethoxide (liquid) were added to anhydrous ethanol and stirred under conditions of about 350 rpm and 35° C. for about 15 min. A result of the stirring was added with niobium ethoxide (liquid) and stirred under the same conditions. Thereafter, an active-material particle precursor was added thereto, thus preparing a mixture.

The mixture was stirred under conditions of about 350 rpm and 45° C. for about 1 hr to 1 hr 30 min, and was then dried to obtain a powdery product.

The product thus obtained was calcined at about 400° C. for about 3 hr to afford a cathode active material.

The cathode active material, a sulfide-based solid electrolyte, a conductor (Super-P), a binder and a dispersant were mixed at a ratio of 76.8:18.5:1.4:2.3:1 to prepare a slurry, which was then applied on a substrate and dried, thus forming a cathode layer.

An anode active material, a solid electrolyte, a binder, and a dispersant were mixed at a ratio of 75.8:19.0:2.2:2.9 to prepare a slurry, which was then applied on a substrate and dried, thus forming an anode layer.

The loading level depending on the weight and area of the cathode layer was adjusted to about 20.0 mg/cm$^2$, and the loading level depending on the weight and area of the anode layer was adjusted to about 11.0 mg/cm$^2$.

A solid electrolyte layer was formed with a sulfide-based solid electrolyte, after which the cathode layer and the anode layer were placed on opposite sides thereof and pressurized for about 5 min under a pressure of 32 MPa, thereby completing an all-solid-state battery.

Example 2

A cathode active material and an all-solid-state battery were manufactured in the same manner as in Example 1, with the exception that the mixture was prepared using the composition according to Example 2 of Table 1.

Example 3

In the composition according to Example 3 of Table 1, lithium ethoxide (powder) and zirconium ethoxide (powder) were added to anhydrous ethanol and stirred under conditions of about 350 rpm and 35° C. for about 15 min. A result of the stirring was added with niobium ethoxide (liquid) and stirred under the same conditions. Thereafter, an active-material particle precursor was added thereto, thus preparing a mixture.

The mixture was stirred under conditions of about 350 rpm and 45° C. for about 1 hr to 1 hr 30 min, and was then dried to obtain a powdery product.

The product thus obtained was calcined at about 700° C. for about 5 hr to afford a cathode active material.

Subsequent procedures were performed in the same manner as in Example 1, thereby manufacturing an all-solid-state battery.

Comparative Example 1

As shown in Table 1 above, the cathode active material that was used was the active-material particle precursor alone, without a separate coating layer formed thereon. With that exception, an all-solid-state battery was manufactured in the same manner as in Example 1.

Comparative Example 2

A cathode active material and an all-solid-state battery were manufactured in the same manner as in Example 1, with the exception that the mixture was prepared using the composition according to Comparative Example 2 of Table 1.

Test Example 1—Analysis of Particle Size Distribution

The particle size distribution of the cathode active materials of Examples 1 to 3 and Comparative Examples 1 and 2 was analyzed using Cilas1090 and Scinco. The results thereof are shown in Table 2 below and in FIG. 5.

TABLE 2

| | Particle size | | |
|---|---|---|---|
| Classification | $D_{10}$ [μm] | $D_{50}$ [μm] | $D_{90}$ [μm] |
| Comparative Example 1 | 3.7 | 6.4 | 10.3 |
| Example 1 | 3.6 | 6.7 | 11.0 |
| Example 2 | 3.6 | 6.5 | 10.5 |
| Comparative Example 2 | 3.5 | 6.1 | 10.1 |
| Example 3 | 3.8 | 6.8 | 11.2 |

Figure 5:
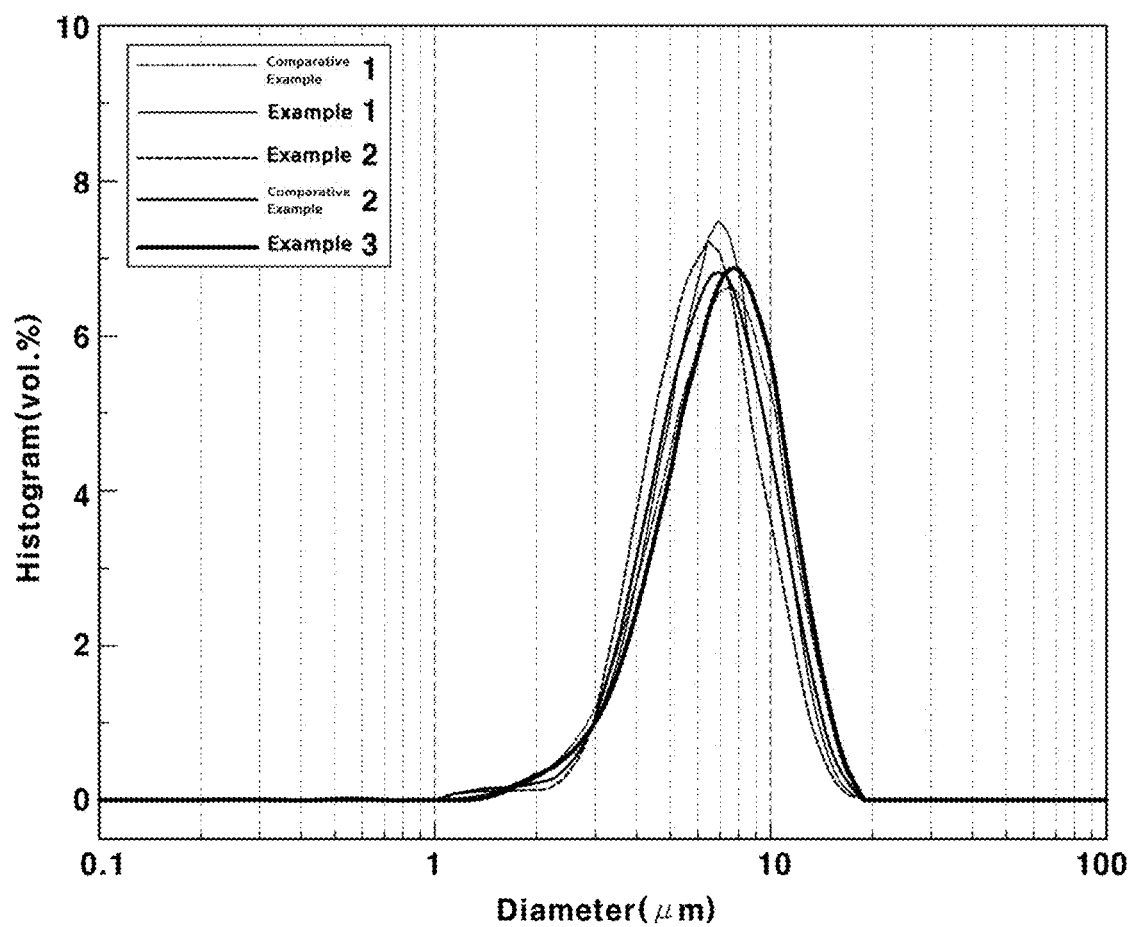
FIG. 5 shows the results of analysis of particle size distribution of each sample in Test Example 1.

As is apparent from Table 2 and FIG. 5, there was little difference in particle size among the cathode active materials of Examples 1 to 3 and Comparative Examples 1 and 2. Therefore, it can be concluded that a phenomenon in which the cathode active materials are agglomerated did not occur.

Test Example 2—XPS (X-Ray Photoelectron Spectroscopy) Analysis

XPS analysis was performed on the coating layer of the cathode active material of Example 1. The results thereof are shown in FIGS. 6A to 6C.

Figure 6A:
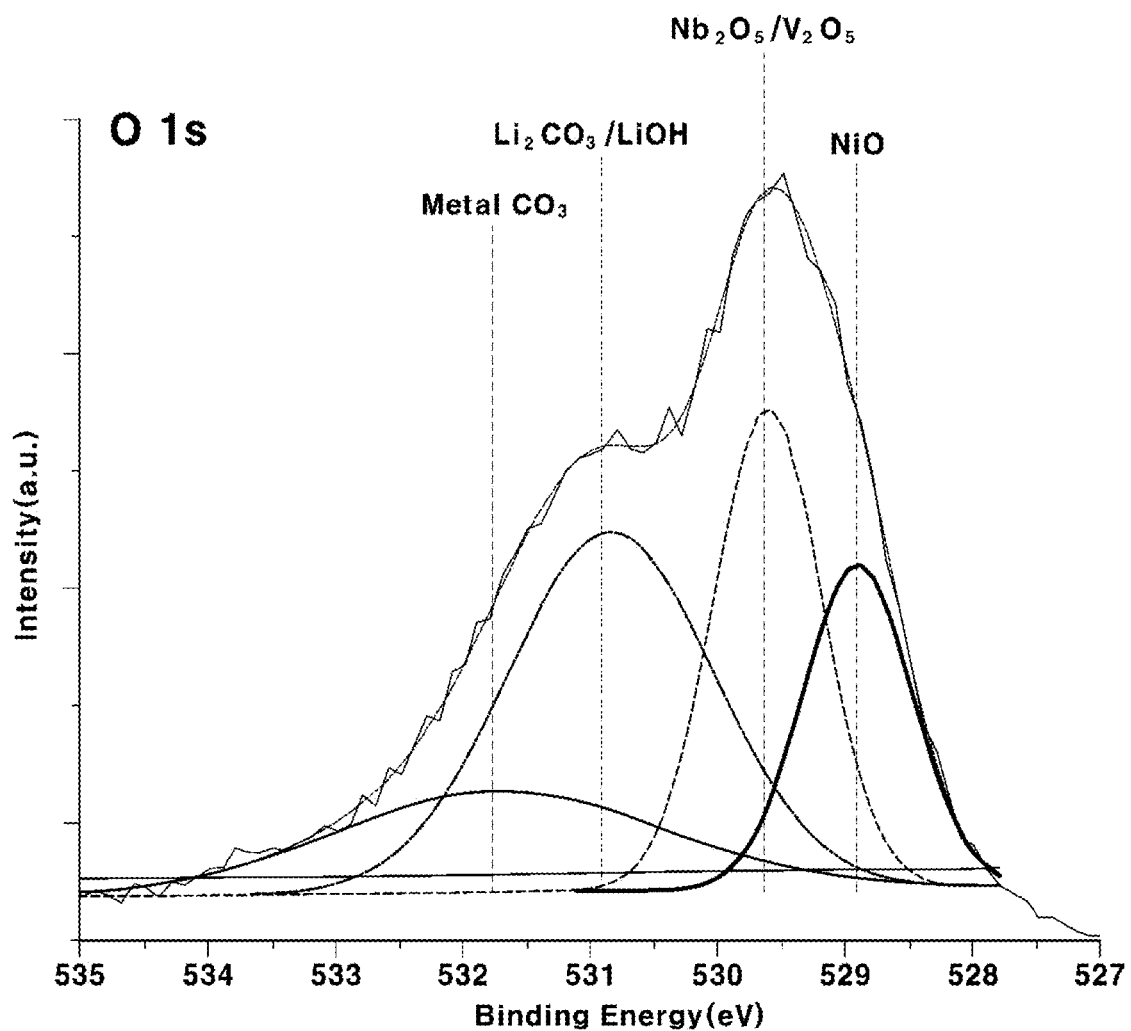
FIGS. 6A, 6B and 6C show the results of X-ray photoelectron spectroscopy (XPS) analysis of the coating layer of the cathode active material of Example 1, FIG. 6A showing the XPS spectrum results of O 1s, FIG. 6B showing the XPS spectrum results of Nb 3d, and FIG. 6c showing the XPS spectrum results of V 2p.
Figure 6B:
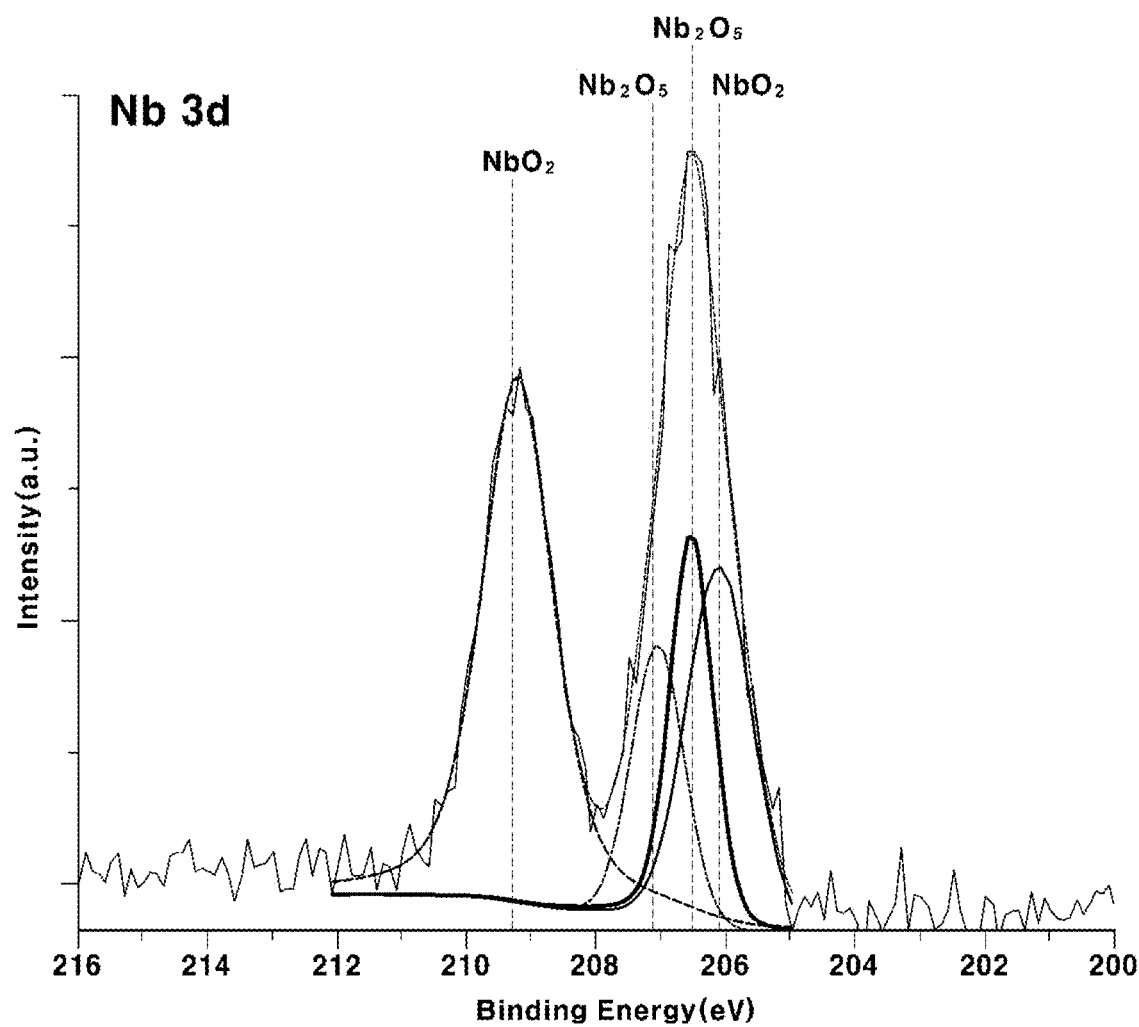
Figure 6C:
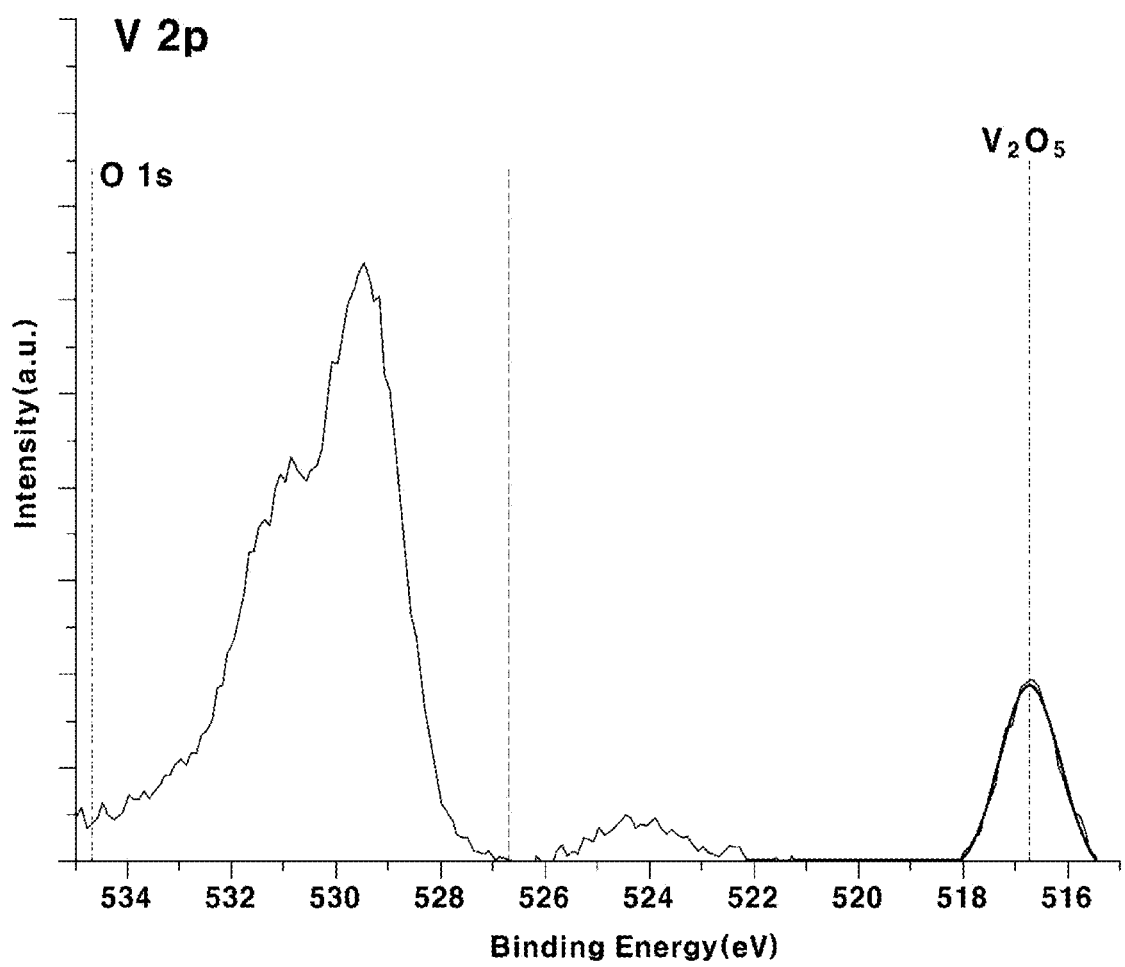

FIG. 6A shows the XPS spectrum results of O 1s, FIG. 6B shows the XPS spectrum results of Nb 3d, and FIG. 6C shows the XPS spectrum results of V 2p.

It can be seen from FIG. 6A that the coating layer had $Nb_2O_5$ and $V_2O_5$ bonding. In addition, it can be seen from FIG. 6B that $NbO_2$ and $Nb_2O_5$ were applied on the surface of the active material particles. In addition, it can be seen from FIG. 6C that a peak of $V_2O_5$ appeared. Therefore, it can be concluded that, in the cathode active material of Example 1, $NbO_2$, $Nb_2O_5$ and $V_2O_5$ played a role in improving the performance of the all-solid-state battery.

Test Example 3—SEM-EDS Analysis on Surface of Cathode Active Material

SEM-EDS (scanning electron microscopy/energy dispersive X-ray spectroscopy) analysis was performed on the surface of the cathode active materials of Example 1 to Example 3. The results thereof are shown in FIGS. 7 to 9.

Figure 7:
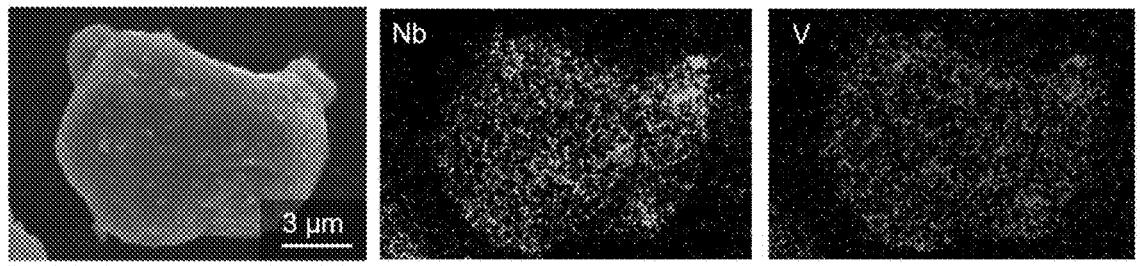
FIG. 7 shows the results of scanning electron microscopy/ energy dispersive X-ray spectroscopy (SEM-EDS) analysis on the surface of the cathode active material of Example 1.
Figure 8:
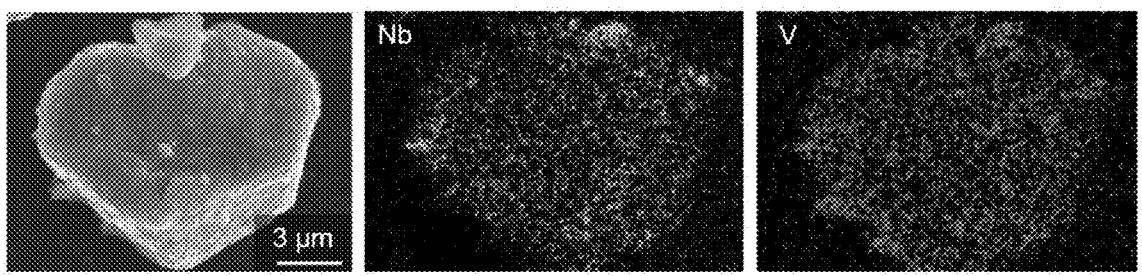
FIG. 8 shows the results of SEM-EDS analysis on the surface of the cathode active material of Example 2.
Figure 9:
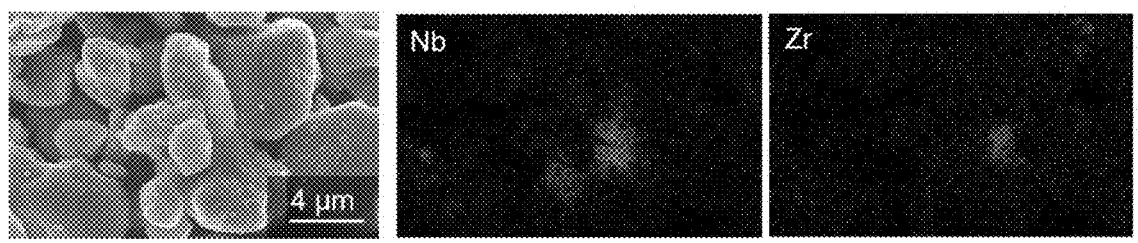
FIG. 9 shows the results of SEM-EDS analysis on the surface of the cathode active material of Example 3.

FIG. 7 shows the results of SEM-EDS analysis on the surface of the cathode active material of Example 1, FIG. 8 shows the results of SEM-EDS analysis on the surface of the cathode active material of Example 2, and FIG. 9 shows the results of SEM-EDS analysis on the surface of the cathode active material of Example 3.

Based on the above results, it can be found that niobium (Nb) and vanadium (V) or zirconium (Zr) were uniformly distributed on the surface of the active material particles of the cathode active material according to the present disclosure.

Figure 10:
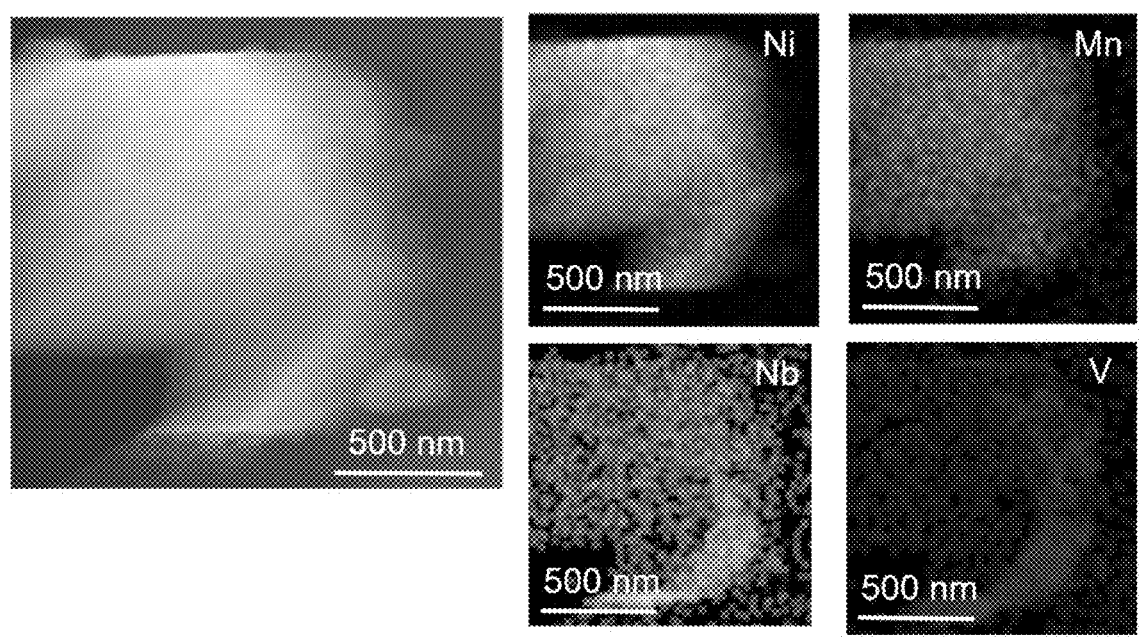
FIG. 10 shows the results of transmission electron microscopy (TEM) analysis on the surface and in the interior of the cathode active material of Example 1.
Figure 11:
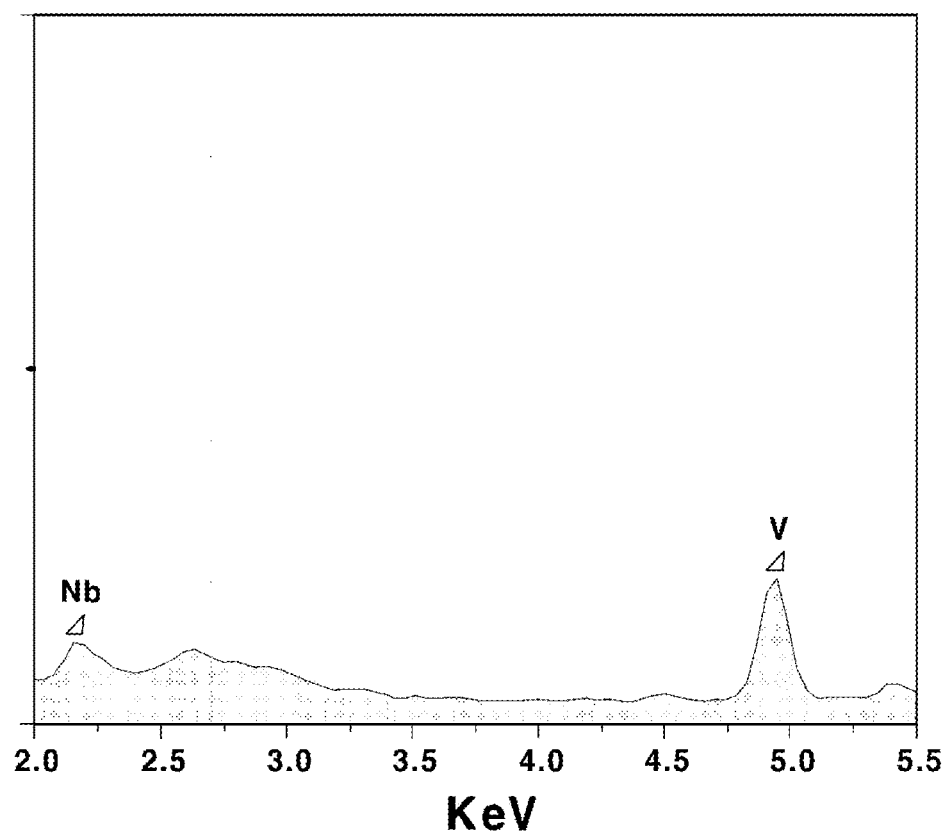
FIG. 11 shows the TEM-EDS spectrum results of the cathode active material of Example 1.

Test Example 4—TEM (Transmission Electron Microscopy) Analysis on Surface and in Interior of Cathode Active Material TEM analysis was performed on the surface and in the interior of the cathode active material of Example 1. Specifically, analysis was carried out at an acceleration voltage of 160 kV using a JEM-ARM300F (JEOL). The results thereof are shown in FIG. 10. Also, FIG. 11 shows the TEM-EDS spectrum results of the cathode active material of Example 1.

Thereby, it can be found that niobium (Nb) and vanadium (V) were distributed on the surface and in the interior of the cathode active material, indicating that niobium (Nb) and vanadium (V) aided in the movement of lithium ions.

Test Example 5—Inductively Coupled Plasma (ICP) Analysis

ICP analysis was performed on the cathode active materials of Examples 1 to 3 and Comparative Examples 1 and 2. The results thereof are shown in Table 3 below.

TABLE 3

| ICP results | Comparative Example 1 | Example 1 | Example 2 | Comparative Example 2 | Example 3 |
|---|---|---|---|---|---|
| Nb [ppm] | — | 12,000 | 11,230 | 11,120 | 8,900 |
| V [ppm] | — | 5,400 | 8,600 | 11,200 | — |
| Zr [ppm] | — | — | — | — | 5,700 |

As is apparent from Table 3, the cathode active materials of Example 1 to Example 3 were found to include niobium (Nb) in a concentration of 11,000 ppm to 12,000 ppm.

Also, the cathode active materials of Example 1 and Example 2 were found to include niobium (Nb) in a concentration of 11,000 ppm to 12,000 ppm and vanadium (V) in a concentration of 5,400 ppm to 8,600 ppm.

Also, the cathode active material of Example 3 was found to include niobium (Nb) in a concentration of 11,000 ppm to 12,000 ppm and zirconium (Zr) in a concentration of 5,400 ppm to 8,600 ppm.

Test Example 6—Analysis of Battery Capacity and Coulomb Efficiency

Figure 12:
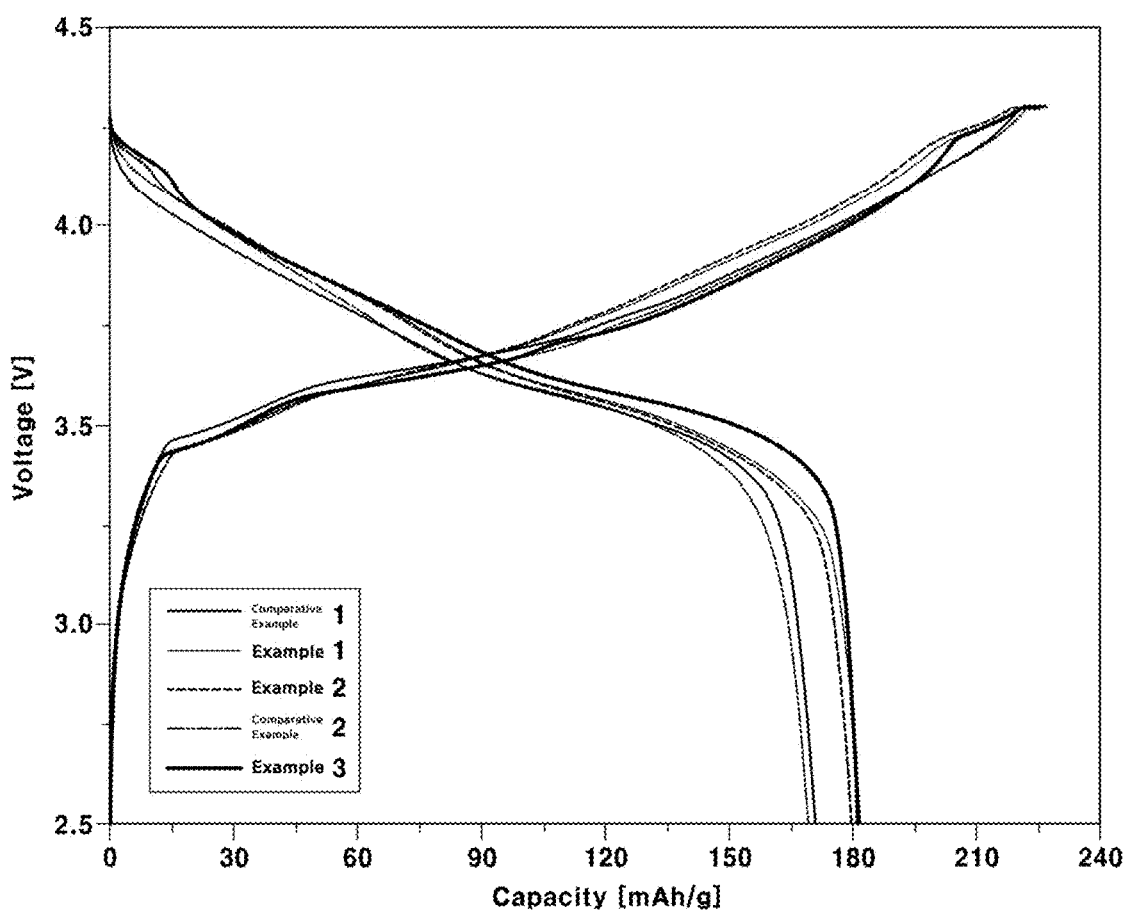
FIG. 12 shows the results of measurement of battery capacity of the all-solid-state batteries of Examples 1 to 3 and Comparative Examples 1 and 2.

The battery capacity and coulomb efficiency of the all-solid-state batteries of Examples 1 to 3 and Comparative Examples 1 and 2 were measured. Specifically, for evaluation of initial formation, the all-solid-state battery was paused for 4 hr, charged in a constant-current (CC) mode up to 4.3V at 0.05 C, and then charged in a constant-voltage (CV) mode to a current corresponding to 0.025 C. Then, it was discharged in a CC mode down to 2.5V at 0.05 C. The results thereof are shown in FIG. 12 and in Table 4 below.

TABLE 4

| Classification | Initial formation capacity [mAh/g] | Initial coulomb efficiency [%] |
|---|---|---|
| Comparative Example 1 | 171 | 75.8 |
| Example 1 | 182 | 80.9 |
| Example 2 | 178 | 79.4 |
| Comparative Example 2 | 169 | 74.5 |
| Example 3 | 182 | 80.7 |

With reference thereto, Example 1 and Example 2 exhibited high capacity and initial coulomb efficiency compared to Comparative Example 1 and Comparative Example 2. In the case of Comparative Example 2, vanadium (V) was used in a large amount and acted as resistance in the battery, whereby the battery capacity and initial coulomb efficiency were lowered.

Meanwhile, it can be found from the results of Example 3 that, when zirconium (Zr) is added in an appropriate amount, an all-solid-state battery having high capacity and initial coulomb efficiency can be obtained.

Based on the above results, it can be confirmed that, when niobium (Nb) and vanadium (V) or zirconium (Zr) are present in appropriate amounts on the surface and in the interior of the active material particles, the performance of the all-solid-state battery is increased by reducing the battery resistance and improving lithium-ion conductivity.

Test Example 7—SEM Analysis on Cross-Section of Cathode Layer

Figure 13:
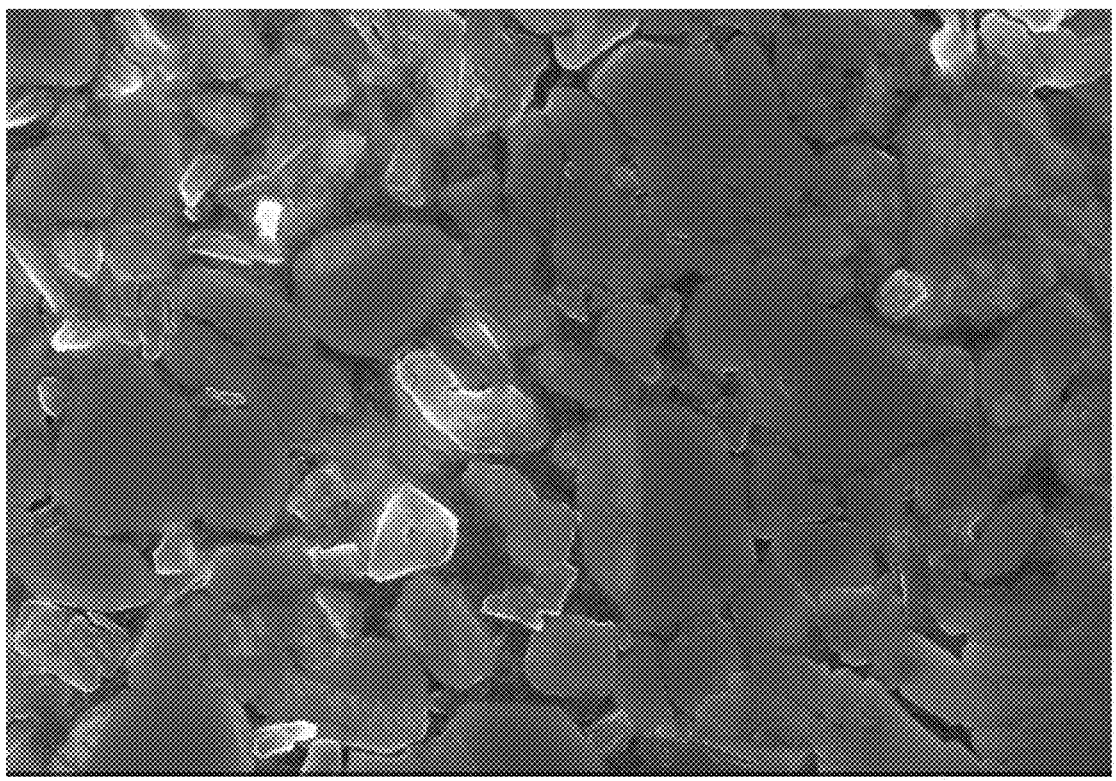
FIG. 13 shows the results of SEM analysis on the cross-section of the cathode layer of the all-solid-state battery of Example 1.
Figure 14:
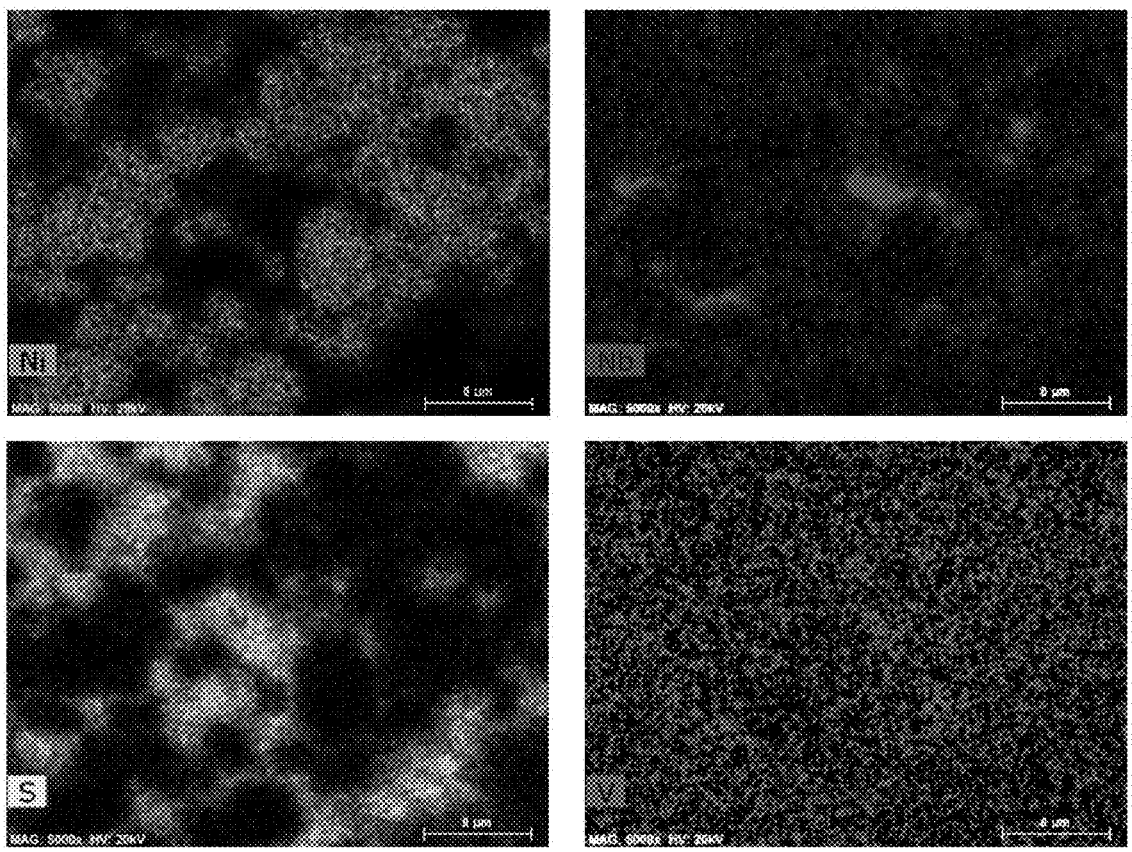
FIG. 14 shows the results of EDS analysis on the cross-section of the cathode layer of the all-solid-state battery of Example 1.

SEM analysis was performed on the cross-section of the cathode layer of the all-solid-state battery of Example 1. The results thereof are shown in FIG. 13. In addition, EDS analysis was performed on the cross-section of the cathode layer. The results thereof are shown in FIG. 14. As shown in FIGS. 13 and 14, the active material particles were surrounded by niobium (Nb) and vanadium (V).

Figure 15:
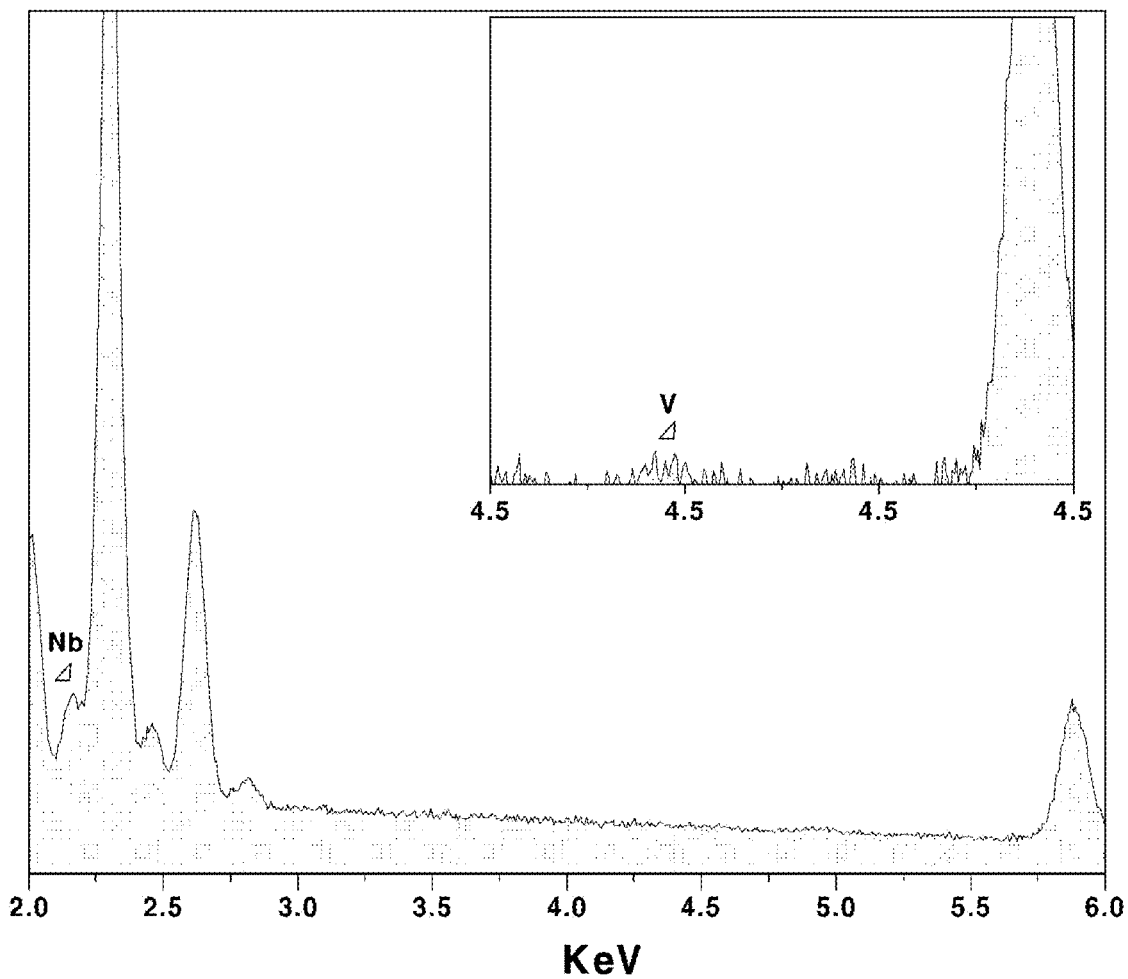
FIG. 15 shows the EDS spectrum results of the cross-section of the cathode layer of the all-solid-state battery of Example 1.

In addition, FIG. 15 shows the EDS spectrum results of the cross-section of the cathode layer. Thereby, it can be confirmed that niobium (Nb) and vanadium (V) are present inside the electrode layer.

Although specific forms of the present disclosure have been described with reference to the accompanying drawings, those skilled in the art will appreciate that the present disclosure may be embodied in other specific forms without changing the technical spirit or essential features thereof. Thus, various forms described above should be understood to be non-limiting and illustrative in every way.

What is claimed is:

1. A cathode active material for an all-solid-state battery, the cathode active material comprising:
    active material particles comprising a compound represented by Chemical Formula 1 below; and
    a coating layer covering at least a portion of a surface of the active material particles, and comprising lithium oxide represented by Chemical Formula 2 below:

$$Li_xV_yNb_wNi_{1-a-b}Co_aM_bO_2, \quad \text{[Chemical Formula 1]}$$

wherein in Chemical Formula 1,
M is at least one element selected from a group consisting of manganese (Mn), aluminum (Al), magnesium (Mg) and combinations thereof, and
x, y, w, a and b are $0.98 \le x \le 1.02$, $0 < y \le 0.01$, $0 < w \le 0.8$, $0 < a \le 0.1$ and $0 \le b \le 0.1$, respectively, $$LiNb_cV_dO_3, \quad \text{[Chemical Formula 2]}$$

wherein in Chemical Formula 2,
c and d are $0 < c \le 0.8$ and $0 < d \le 0.01$, respectively,
wherein the active material particles and the coating layer comprise niobium (Nb) and vanadium (V), and wherein vanadium (V) is contained in the cathode active material in a concentration of 5,400 ppm to 8,600 ppm, and wherein the niobium (Nb) is contained in the cathode active material in a concentration of 11,230 ppm to 12,000 ppm.

* * * * *